Oct. 6, 1970    L. BURGARDT ET AL    3,532,284
FILM SPLICING APPARATUS

Filed Sept. 19, 1968    2 Sheets-Sheet 1

INVENTOR.
LOTHAR BURGARDT
HANS-JÜRGEN KELLNER
GÜNTHER NEUMANN

BY Michael S. Striker
Attorney

United States Patent Office 3,532,284
Patented Oct. 6, 1970

3,532,284
FILM SPLICING APPARATUS
Lothar Burgardt, Neu-Grunwald, Hans-Jürgen Kellner, Munich, and Günther Neumann, Grunwald, Germany, assignors to Agfa-Gevaert Aktiengesellschaft, Leverkusen, Germany
Filed Sept. 19, 1968, Ser. No. 760,792
Claims priority, application Germany, Sept. 29, 1967, 1,597,655
Int. Cl. B65h 19/16
U.S. Cl. 242—58.1      10 Claims

ABSTRACT OF THE DISCLOSURE

A splicing apparatus which automatically unites the leading end of an exposed roll film with the trailing end of the preceding exposed roll film comprises a magazine with radially extending chambers for film cartridges and with axially parallel guide slots for the leading ends of films in such cartridges. The magazine is indexible by a motor to move an empty chamber to a receiving position and to simultaneously place a filled chamber into a discharging position in which the leading end of film in the corresponding slot is engaged by a conveyor and is transported to a splicing station where the leading end is united with the trailing end of the preceding film. The resulting web is collected by a takeup reel. The leading ends of films are trimmed during indexing of the magazine and an empty cartridge in a chamber assuming the discharging position drops into a chute cooperating with a retaining device which intercepts the empty cartridge for an interval of time which at least equals the interval required by the conveyor to withdraw a full-length film from its cartridge.

BACKGROUND OF THE INVENTION

The present invention relates to splicing apparatus for flexible webs or tapes, and more particularly to improvements in splicing apparatus for exposed roll film which is stored in cartridges, cassettes, magazines or like containers. Still more particularly, the invention relates to an apparatus which can unite a large number of individual roll films into a single continuous strip which is thereupon convoluted on a reel and is ready to be transported through a continuous developing machine.

Splicing of exposed but undeveloped films must be performed in complete darkness. Furthermore, each splicing operation should be carried out at a high speed so as to insure that the developer receives a continuous web of exposed film and that the exposed and developed film or pictures made from such film can be returned to customers with a minimum of delay.

SUMMARY OF THE INVENTION

It is an object of the present invention to provide a splicing apparatus which is capable of automatically uniting a large number of individual roll films into a continuous web ready for transfer into a continuous developing machine, which can unite successive roll films at rapidly following intervals, with a minimum of delay between successive splicing operations, and in such a way that the ends of successive films are properly trimmed and placed end-to-end prior to splicing.

A further object of the invention is to provide the splicing apparatus with a device which automatically detects and intercepts cartridges, cassettes or magazines which are likely to contain one or more fragments of exposed film, successive exposed films to a splicing station and for respectively trimming the front and rear portions of each film prior to splicing to the preceding film and prior to splicing to the next-following film.

An ancillary object of the invention is to provide the apparatus with means for automatically detecting those films which are shorter than a film of normal length.

A concomitant object of the invention is to provide a splicing apparatus which can be used to unite films of different width and/or length and which can be serviced and supervised by unskilled or semiskilled persons.

The improved apparatus is utilized to unite the ends of successive films which are stored in cartridges, cassettes or analogous containers. The apparatus comprises a magazine having a plurality of container-accommodating chambers and being indexible by a motor or the like between at least two positions in each of which one of the chambers is accessible for reception of a fresh container and another chamber assumes a discharging position, guide means provided in the magazine for receiving the front portion of film stored in a container which is accommodated in one of the chambers, and trimming means for trimming the front portion of a film in one of the guide means in response to indexing of the magazine. The magazine is preferably indexible to a plurality of positions whose number equals that of the chambers. The chamber which assumes the discharging position is open from below and the apparatus further comprises a duct, chute or analogous transporting means for empty containers. The transporting means has an inlet which registers with the open end of the chamber in discharging position so that the transporting means can receive an empty container by gravity as soon as the corresponding exposed film is withdrawn from the container.

The novel features which are considered as characteristic of the invention are set forth in particular in the appended claims. The improved film splicing apparatus itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
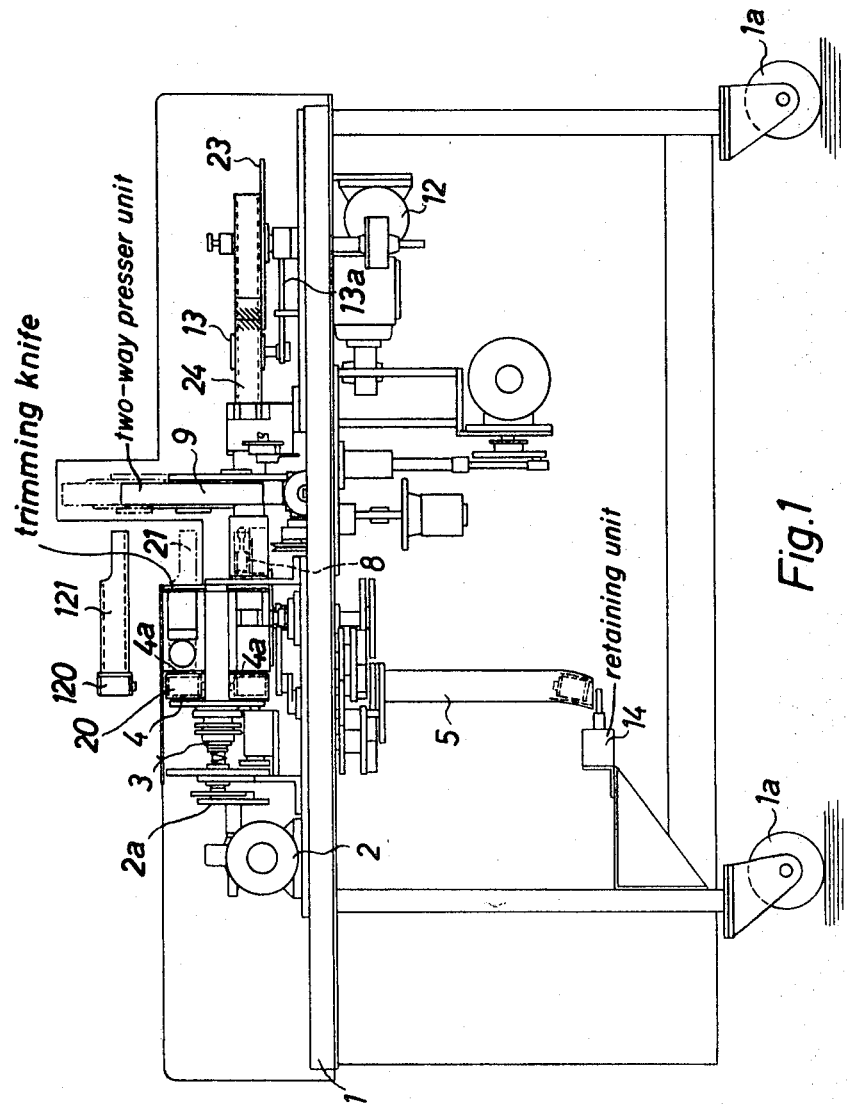
FIG. 1 is a schematic side elevational view of a splicing apparatus which embodies the invention.
Figure 2:
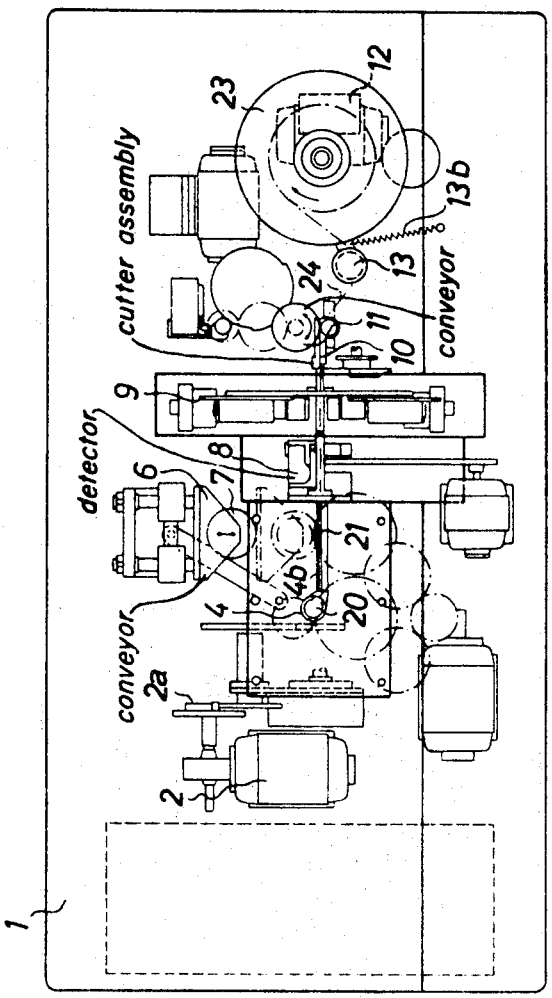
FIG. 2 is a top plan view of the splicing apparatus.

The apparatus shown in FIGS. 1 and 2 comprises a table or main support 1 which is mounted on wheels 1a and carries the splicing assembly. The table 1 further supports a first prime mover 2 which is preferably an electric motor and serves as a means to index a horizontal spindle 3 by way of a suitable transmission 2a. The arrangement is such that, when the motor 2 is energized, the spindle 3 is turned through 180 degrees and the motor is thereupon arrested automatically. The spindle 3 carries a substantially cylindrical magazine 4 which is provided with at least one pair of chambers 4a (one pair shown) located diametrically opposite each other with reference to the axis of the spindle 3. The chambers 4a extend radially with reference to the axis of the spindle 3 and have open outer ends. Each of these chambers 4a can accommodate a film cartridge or cassette 20 in such a way that the front portion of the film 21 extends from the mouth of the respective cartridge. The magazine 4 is further provided with axially parallel guide slots 4b for the film 21 and such slots extend inwardly from the periphery of the magazine. Thus, a cartridge 20 can be readily inserted into that chamber 4a which is located in the upper portion of the magazine, i.e., whose open end faces upwardly. Each chamber 4a communicates with one of the slots 4b.

The axial end of the magazine 4 which is remote from the chambers 4a carries a trimming knife or cutter (not identified in the drawing) which cooperates with a fixed trimming knife or cutter on the table 1 to sever that part of the front portion of film 21 which extends beyond the respective axial end of the magazine 4. The thus severed fragments of film drop into a suitable depression or trough provided in or on the table 1.

When the magazine 4 is rotated through 180 degrees, the cartridge 20 which was inserted into the upper chamber 4a is located in the lower chamber which then assumes a discharging position and communicates with an opening in the table 1, and such opening communicates with the inlet at the upper end of a transporting duct or chute 5 for empty cartridges. The chute conveys empty cartridges into a collecting receptable, not shown. The trimmed front portion of film 21 in a cartridge which fills the lower chamber 4a is still accommodated in the corresponding slot 4b whose open side (in the periphery of the magazine 4) overlies a portion of the table 5 to thus prevent the film from leaving the slot by gravity. The film, in turn, prevents the corresponding magazine 20 from leaving the lower chamber 4a and from entering the inlet of the chute 5.

The magazine 4 is further provided with two peripheral recesses or cutouts each of which extends substantially at right angles to one of the slots 4b. Such recesses can receive a portion of a first conveyor 6 which is movable to and from an operative position (shown in FIG. 2 by broken lines) in directions at right angles to the axis of the spindle 3. The conveyor 6 comprises a driver roller 7 which can enter one of the aforementioned recesses in the magazine 4 and then advances the film 21 lengthwise along a predetermined path, i.e., through and beyond the corresponding guide slot 4b. While it is being transported by the roller 7, the film actuates a detector or sensing device 8 whose purpose will be described later. The table 1 further supports, adjacent to the path of movement of film under the action of the roller 7, splicing unit 9 for applying adhesive-coated uniting bands to each side of the front portion of film 21 moving out of one of the slots 4b and to the trailing portion of the preceding film 24, a second trimming assembly 10, a reversible second conveyor 11, and a drive 12 which serves to rotate a takeup reel 23 for a web of composite roll film including a series of individual films joined end-to-end. A looping roll 13 is mounted on the table 1 upstream of the takeup reel 23 to store a certain amount of film in the region between the takeup reel and the conveyor 11. The roll 13 is mounted on a pivotable arm 13a and is biased by a helical spring 13b.

The lower end of the chute 5 is adjacent to a retaining or intercepting unit 14 which can be deactivated by a control system to be described hereinafter. FIG. 1 further shows a fresh cartridge 120 with a length of film 121 which is held ready for insertion into one of the chambers 4a upon completed indexing of the magazine 4 through 180 degrees.

The operation is as follows:

It is assumed that the upper chamber 4a of the magazine 4 is empty and that the motor 2 is idle. The operator withdraws from a freshly supplied cartridge 20 a certain length of film 21, namely, a length which exceeds the length of a guide slot 4b and which insures that, upon insertion of the cartridge 20 into the upper chamber 4a, the corresponding slot 4b receives a portion of film of constant width, i.e., the narrow leading end of the film 21 is located to the right of the right-hand axial end of the magazine 4. In other words and regardless of its length, the relatively narrow leading end of the front portion of film 21 is located to the right of the upper slot 4b. The operator then depresses a starter button (not shown) which completes the circuit of the motor 2 and causes the transmission 2a to index the magazine 4 through 180 degrees. The motor 2 is then arrested in a fully automatic way. The ratio of the transmission 2a can be such that the motor 2 can complete one, two or more revolutions in order to rotate the spindle 3 and the magazine 4 through 180 degrees. The narrow leading end of the front portion of film 21 in the upper guide slot 4b is severed in automatic response to such indexing of the magazine 4 so that the thus trimmed film does not extend beyond the right-hand end face of the magazine when the corresponding cartridge registers with the inlet at the upper end of the duct 5. An automatic programming system of the splicing apparatus causes the driver roller 7 of the conveyor 6 to enter one of the aforementioned recesses in the magazine 4 and to advance the trimmed film 21 lengthwise through a predetermined distance, namely, through a distance which suffices to move the neatly trimmed front edge of film 21 from the lower slot 4b into the central region of the splicing unit 9. At the same time, the second conveyor 11 causes the trailing portion of the preceding film 24 to move backwards from the trimming assembly 10 to the splicing unit 9. The edge face at the trailing portion of film 24 then abuts against the trimmed edge face of film 21 which was advanced by the driver roller 7. The programming system thereupon causes the splicing unit 9 to apply adhesive-coated uniting bands to both sides of the two films which are disposed end-to-end, and the splicing unit is further provided with trimming blades (not shown) which automatically trim the uniting bands so that they do not extend laterally beyond the marginal portions of the thus united films. When the splicing step is completed, the motor 12 begins to rotate the takeup reel 23 in a sense to draw the film in a direction to the right, as viewed in FIG. 2, i.e., the reel 23 collects the film and simultaneously draws film 21 from the cartridge 20 in the lower chamber 4a of the magazine 4. Such rotation of the takeup reel 23 continues until the trailing end of film 21 is withdrawn from the cartridge 20 in the lower chamber 4a, i.e., the film 21 is actually detached from the core of its cartridge. As soon as such separation takes place, the empty cartridge automatically descends through the aforementioned opening in the table 1 and travels downwardly through the chute 5 to be intercepted by the retaining unit 14.

When the trailing portion of the film 21 moves beyond the detector 8, the latter energizes a delay circuit which arrests the motor 12 for the takeup reel 23 after a predetermined interval of time, namely, after an interval which suffices to move the trailing portion of the film 21 (which was withdrawn from the lower slot 4b of the magazine 4) close to the trimming assembly 10 (but still to the left of such trimming assembly, as viewed in FIG. 2). When the film 21 is arrested, i.e., when the takeup reel 23 is at a standstill, the trimming assembly 10 is caused to automatically sever the trailing portion of film 21 so as to provide a clean transverse cut which insures that the trailing portion of the film 21 can be placed exactly end-to-end with the trimmed front portion of the next-following film.

The second conveyor 11 is reversible and is thereupon started in a sense to move the freshly trimmed trailing portion of the film 21 backwards toward the center of the splicing unit 9. That length of film 21 which is necessary to permit such backward movement of the last film is not removed from the takeup reel 23 because the looping roll 13 accumulates a sufficient length of film 21 upstream of the takeup reel. The roll 13 then pivots in a clockwise direction, as viewed in FIG. 2, and the spring 13b stores energy.

The operator can insert a fresh cartridge 120 into that chamber 4a which opens upwardly not later than at the time when the magazine 4 completes one-half of a revolution. A fresh splicing operation can begin as soon as the film 121 in the cartridge 120 is properly threaded through the corresponding slot 4b.

The purpose of the retaining unit 14 is to temporarily retain cartridges which descent through the chute 5. This is important when a cartridge accommodates damaged film, for example, a film which is torn and thus comprises two or more sections at least one of which remains in the cartridge when the foremost section is evacuated by the driver roller 7. The receptacle which receives empty cartridges from the chute 5 is rather large and can accommodate a substantial number of empty cartridges so that it would require much time to find in such receptacle a cartridge which contains a piece of exposed film. The retaining unit intercepts and holds a cartridge until after the detector 8 determines the length of film which was withdrawn from the last cartridge; if such length is less than a predetermined minimum length, the detector 8 produces a signal which informs the operator that the cartridge which was intercepted by the retaining unit 14 probably contains a piece of exposed film. The operator then maintains the retaining unit 14 in operative position and removes the cartridge at the lower end of the duct 5. For example, the detector 8 can complete the circuit of a signal lamp which lights up if the trailing end of the last film advances beyond the detector after an interval which is shorter than that required for transport of a full-length film by the roller 7 of the conveyor 6. The lamp circuit may include a photoelectric receiver or the like. The retaining unit 14 constitutes a desirable auxiliary feature of the splicing apparatus in that it enables the person in charge to insure detection of damaged film and the development of each exposed film frame even if exposed film in a cartridge consists of two or more pieces.

An attendant who is in charge of servicing the splicing apparatus can perform his or her work in complete darkness. All that is necessary is to take a loaded cartridge from a receptacle, withdraw the front portion of film from the cartridge, insert the cartridge into the upper chamber 4a and the extracted length of film into the corresponding slot 4b, and press the starter button for the motor 2. The just described steps can be readily performed by unskilled or semiskilled persons.

Of course, the magazine 4 may be provided with two or more pairs of chambers. The motor 2 is then designed to index the magazine in such a way that a filled chamber is adjacent to the table 1 and that an empty chamber is accessible for insertion of a fresh cartridge in response to each operation of the motor.

What is claimed as new and desired to be protected by Letters Patent is:

1. In an apparatus for uniting the ends of successive films which are stored in containers, a combination comprising a magazine having a plurality of container-accommodating chambers and being indexible between at least two positions in each of which one of said chambers is accessible for reception of a fresh container and another chamber assumes a discharging position, said magazine further having guide means for receiving the front portion of film stored in that container which is accommodated in one of said chambers; and trimming means for trimming the front portion of a film in one of said guide means in response to indexing of said magazine.

2. A combination as defined in claim 1, wherein the number of said positions corresponds to the number of said chambers.

3. A combination as defined in claim 1, wherein the chamber assuming said discharging position is open from below, and further comprising transporting means for empty containers, said transporting means having an inlet registering with the chamber in said discharging position.

4. A combination as defined in claim 3, further comprising means for temporarily intercepting empty containers which are free to leave the chamber assuming said discharging position and enter said transporting means.

5. A combination as defined in claim 4, wherein said intercepting means comprises a retaining unit arranged to intercept successive empty containers for a predetermined interval of time which is at least as long as the interval required to withdraw a full-length film from the container in the chamber assuming said discharging position.

6. A combination as defined in claim 1, further comprising a conveyor movable to and from an operative position in which it engages the film extending from the container in the chamber assuming said discharging position to transport the film lengthwise along a predetermined path, detector means adjacent to said path and arranged to detect the trailing end of the thus transported film, a splicing unit arranged to unite the front portion of the thus transported film with the trailing portion of the preceding film, a second conveyor located downstream of said splicing unit and operative to transport the united films forwardly and backwards, and rotary take up means arranged to collect the united films.

7. A combination as defined in claim 6, wherein said splicing unit comprises means for applying adhesive-coated uniting bands to both sides of the portions of film which are being united by said splicing unit.

8. A combination as defined in claim 6, further comprising second trimming means operative to trim the trailing portion of a film which is united with the preceding film.

9. A combination as defined in claim 8, further comprising drive means for rotating said take up means.

10. A combination as defined in claim 8, wherein said second trimming means is located past said splicing unit and wherein said second conveyor is arranged to move the united films backwards so that the trailing portion of the last film is returned to said splicing unit and is ready to be united with the front portion of the next-following film.

References Cited
UNITED STATES PATENTS

| | | | |
|---|---|---|---|
| 1,540,831 | 6/1925 | De Moos | 242—58.1 |
| 2,998,204 | 8/1961 | Walsh | 242—58.1 |

NATHAN L. MINTZ, Primary Examiner